United States Patent Office 3,278,445
Patented Oct. 11, 1966

3,278,445
STABILIZED BORATE COMPOSITIONS
Harold A. Kerry, Whittier, and Alford L. Andersen, Jr., La Habra, Calif., assignors to American Potash & Chemical Corporation, Los Angeles, Calif., a corporation of Delaware
No Drawing. Filed Mar. 30, 1964, Ser. No. 355,955
3 Claims. (Cl. 252—137)

The present invention relates to novel stabilized borate compositions particularly adapted for use in the commercial manufacture of alkaline perborates.

Alkaline perborates such as sodium perborate are used widely as bleaching compositions in laundries. The sodium or other alkaline perborate is introduced into the washing solution either alone or in combination with soaps, detergents or other cleansing compositions. The use of sodium perborate results in an effective bleaching action in such washing operations because of the evolution of active oxygen.

One commercial method for preparing alkaline perborates such as sodium perborate comprises a two-stage operation employing a borate such as commercial, anhydrous borax as a starting material. In that process, the borax is admixed with water and reacted initially with sodium hydroxide to form sodium metaborate. Then, the sodium metaborate is reacted with hydrogen peroxide in quantities sufficient to form sodium perborate. Crystals that separate from this solution then are suitably dried to provide crystals of sodium perborate which are adapted for convenient introduction into laundry wash water.

Difficulties have been encountered in certain instances in the manufacture of sodium perborate in accordance with this process when conventional commercially available borates are used as starting materials. It has been observed, for example, that the sodium perborate sometimes decomposes, by giving off oxygen, and reverts to sodium metaborate before the sodium perborate solution can be completely crystallized.

It now has been discovered that the decomposition of the aqueous sodium perborate apparently is effected, perhaps catalyzed, by the presence of certain trace metals in the borate starting material. These trace metals, primarily iron and manganese, apparently adversely effect the aqueous sodium perborate solution in such manner that, through a mechanism not fully understood at present, a reversion of the perborate to metaborate occurs.

In accordance with the present invention stable borate compositions are provided which can be used satisfactorily in the above-described process for manufacturing alkaline perborates. These compositions of this invention comprise borates in combination with relatively small quantities of certain stabilizing agents. The stabilizing agents apparently complex or otherwise sequester the trace metal contaminants, primarily iron and manganese, and prevent the same from catalyzing the reversion of the aqueous alkaline perborate to the metaborate form.

The invention is applicable to what may be termed commercially available borate compositions including, for example, "borax" in its usual forms such as boric acid, meta-, tetra-, and pentaborates and hydrated forms thereof. These borates generally are used in the form of their sodium salts.

The particular stabilizing materials that have been found to be effective in sequestering or complexing the aforementioned trace metal contaminants comprise ethylene diamine tetraacetic acid as well as the alkali metal and alkaline earth metal salts thereof. It has been found that the incorporation of as little as one pound of said stabilizer in each ton of commercial borate is sufficient to effectively inhibit reversion of the perborate to metaborate when the compositions of this invention are used as starting materials in that process.

The stabilizer is a dry powder and may be incorporated with borate powder conveniently merely by stirring and blending in suitable mixing apparatus. The resultant novel combination of mixed, particulate borate-stabilizer composition is stable for long periods of time, is readily soluble in water and is adapted for convenient incorporation in commercial alkaline perborate manufacturing procedures.

The fact that trace metals, particularly iron and manganese, in the borax starting material cause the reversion of perborate to metaborate was discovered in the course of a series of experimental determinations. Thus, a quantity of what, for convenience, may be termed "pure" borax was obtained. It was subjected to a stability test to give a measure of its quality. The test comprised a determination of the rate of decomposition of a perborate solution (prepared from the borax) over a period of 6 hours.

More specifically, a solution of sodium perborate was prepared from the "pure" borax. Periodic determinations were made of the percent active oxygen lost from the perborate solution over a period of 6 hours. It was determined that the loss amounted to about 32.0%. Since that perborate solution was satisfactory, the value 32.0% is arbitrarily defined herein as "acceptable". Thus, a borate is an "acceptable" starting material in the above-described commercial process for manufacturing alkaline perborates if, when converted therein to its metaborate form, in solution, it exhibits an active oxygen loss over a period of 6 hours of 32.0% or less.

A number of commercially available anhydrous borates were tested to determine their suitability for use as starting materials in the perborate process. Not one was "acceptable" since, when converted to perborates and tested in solution, their active oxygen loss over a six hour period ranged from 80-90% and, in some cases, even higher.

In an effort to determine the cause for the loss of active oxygen, a number of different metals and compounds were added to samples of "pure borax", (sodium tetraborate decahydrate) the so-called "acceptable" borax, and then tested for loss of oxygen. The results are set forth in the following table.

TABLE

| Additive | Concentration (Parts per per million) | Percent Active Oxygen Lost over 6 Hrs. |
|---|---|---|
| None | None | 32 |
| Cu | 1 | 35 |
| Zn | 20 | 32 |
| Mn | 1 | 99 |
| Mn | 0.1 | 54.5 |
| Mn | 0.01 | 31 |
| Sb | 10 | 31 |
| Ni | 1 | 30 |
| Ti | 10 | 26 |
| V | 1 | 30 |
| Fe | 5 | 71 |
| Fe | 10 | 80 |
| Fe | 25 | 91 |
| $Na_3AsO_4$ | 10 | 32 |
| $NaNO_3$ | 10,000 | 34 |
| $NaNO_2$ | 100 | 39 |
| NaCl | 10,000 | 35 |

The results of the determinations, as set forth in the table, indicate that metals, particularly iron and manganese, are the cause of the oxygen loss and resultant instability of the product for perborate manufacture.

For a more complete understanding of the present invention the following specific examples are set forth.

*Example I*

A sample of commercially available anhydrous borax containing both iron and manganese in contaminating amounts and exhibiting an active oxygen loss over a six hour period of 87% was treated in the following manner in an attempt to upgrade it to a condition such that it would be "acceptable" for use as a starting material for perborate manufacture.

The sample was dissolved in water and then crystallized. The crystals were redissolved in water, treated with NaOH to convert it to sodium metaborate and then reacted with hydrogen peroxide to provide an aqueous solution of sodium perborate. That solution then was tested and found to have an active oxygen loss over a six hour period of 79%.

*Example II*

The supernatant filtrate obtained from the crystallization process of Example I was reacted with sodium hydroxide to form sodium metaborate. That then was reacted with hydrogen peroxide to form an aqueous solution of sodium perborate. That solution was then tested and found to have an active oxygen loss over a six hour period of 80%.

*Example III*

Another quantity of the sample of commercially available anhydrous borax described in Example I was dissolved in a suitable quantity of water and filtered. The filtrate was converted to sodium metaborate and then sodium perborate in the manner described in the above examples. The resultant sodium perborate solution was tested and found to have an active oxygen loss over a six hour period of 85%.

*Example IV*

Still another sample of the commercially available anhydrous borax described in Example I was dissolved in a suitable quantity of water. To that solution was added about 1% by weight of sodium-magnesium silicate. The resultant mixture was stirred and allowed to settle. A fluocculated precipitate formed and slowly settled out. The mixture was filtered, after which the filtrate was reacted successively with sodium hydroxide and hydrogen peroxide in the manner described in the foregoing examples to provide an aqueous solution of sodium perborate. On test, that solution was found to have an active oxygen loss over a six hour period of 43%.

*Example V*

A further quantity of the anhydrous borax described in Example I was preoxidized with hydrogen peroxide and allowed to stand until the active oxygen was lost. This material then was converted to sodium perborate in the manner described hereinabove. On test, the resultant solution of sodium perborate exhibited an active oxygen loss over a six hour period of 96%.

*Example VI*

A quantity of the anhydrous borax described in Example I was dissolved in water and then passed through a bed of commercially available anion exchange resin. The borax solution thus obtained then was converted to sodium perborate in the manner described hereinabove. On test, that perborate solution exhibited an active oxygen loss over a period of six hours of 71%.

*Example VII*

A series of runs were made in which varying quantities, as set forth in tabular form below, of the disodium salt of ethylene diamine tetraacetic acid were added to separate one ton quantities of the anhydrous borax described in Example I.

Each of the resultant mixtures then was dissolved in water, reacted with sodium hydroxide to form sodium metaborate and then treated with hydrogen peroxide to provide aqueous solutions of sodium perborate. Each of those solutions then was tested and found to have active oxygen losses over six hour periods in the amounts set forth below.

| Pounds of Disodium Salt of Ethylene Diamine Tetraacetic Acid | Percent Active Oxygen Lost over 6 Hrs. |
|---|---|
| 0.67 | 71 |
| 1.34 | 28 |
| 2.00 | 21 |
| 3.34 | 19 |
| 6.68 | 18 |

*Example VIII*

One pound of ethylene diamine tetraacetic acid was admixed thoroughly with one ton of the anhydrous borax described in Example I. The resultant dry mixture then was dissolved in water and reacted with sodium hydroxide to form sodium metaborate. Hydrogen peroxide then was added to provide an aqueous solution of sodium perborate. On test, that solution was found to have an active oxygen loss over a six hour period of 15.6%.

The foregoing examples illustrate that the stabilizers of this invention comprising ethylene diamine tetraacetic acid as well as the di- and tetra- salts thereof, when admixed with contaminated borates in amounts within the range of about 0.5 to 1.5 pounds per ton of borates, provide a product imminently suitable for use as a starting material in the commercial production of alkaline perborates, in the manner herein described.

While the invention has been described with reference to the preferred embodiments thereof, it will be understood, of course, that certain changes, substitutions, modifications and the like may be mold therein without departing from its true scope.

What is claimed is:

1. A composition consisting essentially of a borate selected from the group consisting of boric acid, sodium metaborate, sodium tetraborate, sodium pentaborate and hydrated forms thereof, contaminated with minor amounts of manganese and iron and containing, in combination with each ton thereof, from about 0.5 to 1.5 pounds of a stabilizer selected from the group consisting of ethylene diamine tetraacetic acid and, alkali metal salts of ethylene diamine tetraacetic acid, and alkaline earth metal salts of ethylene dimine tetraacetic acid.

2. A composition consisting essentially of an intimate, particulate mixture of borax contaminated with minor amounts of manganese and iron and, in admixture with each one ton thereof, from about 0.5 to 1.5 pounds of a stabilizer selected from the group consisting of ethylene diamine tetraacetic acid, alkali metal salts of ethylene diamine tetraacetic acid, and alkaline earth metal salts of ethylene diamine tetraacetic acid.

3. A composition consisting essentially of an intimate, particulate mixture of borax contaminated with minor amounts of manganese and iron, said composition containing a stabilizer therefor selected from the group consisting of ethylene diamine tetraacetic acid, alkali metal salts of ethylene diamine tetraacetic acid, and alkaline earth metal salts of ethylene diamine tetraacetic acid, in amounts sufficient to sequestor said manganese and iron when the composition is in an aqueous medium.

References Cited by the Examiner

UNITED STATES PATENTS

| 2,717,243 | 9/1955 | Block et al. | 252—138 |
| 2,979,464 | 4/1961 | Pistor | 252—99 |
| 3,039,970 | 6/1962 | Kreuger et al. | 252—156 X |

LEON D. ROSDOL, *Primary Examiner.*

JULIUS GREENWALD, ALBERT T. MEYERS,
*Examiners.*

J. T. FEDIGAN, *Assistant Examiner.*